United States Patent [19]
Cross et al.

[11] 3,888,908

[45] June 10, 1975

[54] POLYESTER POLYOLS

[75] Inventors: James M. Cross, New Martinsville, W. Va.; George A. Hudson, Venetia; Joseph C. Hixenbaugh, Aliquippa, both of Pa.

[73] Assignee: Mobay Chemical Corporation, Pittsburgh, Pa.

[22] Filed: Mar. 6, 1973

[21] Appl. No.: 338,470

[52] U.S. Cl....... 260/475 P; 260/75 NP; 260/485 G
[51] Int. Cl........................ C07c 69/76; C07c 69/80
[58] Field of Search........... 260/75 NP, 31.4, 475 P, 260/485 G

[56] References Cited
UNITED STATES PATENTS

| | | | |
|---|---|---|---|
| 2,811,493 | 10/1957 | Simon | 260/75 NP |
| 3,057,824 | 10/1962 | Bras | 260/485 G |
| 3,157,618 | 11/1964 | Bras | 260/475 P |
| 3,331,802 | 7/1967 | Huber | 260/485 G |

*Primary Examiner*—Theodore Morris
*Attorney, Agent, or Firm*—Lawrence S. Pope

[57] ABSTRACT

Polyester polyols and coating compositions prepared therefrom are disclosed. The polyesters are prepared from conventional starting materials and are formulated so as to contain from about 0.7 to about 1.3 branch points per 1000 molecular weight units.

2 Claims, No Drawings

POLYESTER POLYOLS

This invention relates to polyester polyol compositions and more particularly to high equivalent weight polyester polyols suitable for use in the preparation of light-stable urethane coatings.

The preparation of polyesters from dicarboxylic acids, dicarboxylic acid anhydrides and polyhydric alcohols is well known and is described, for example, in U.S. Pat. Nos. 3,157,618 and 3,162,616.

In the production of polyester polyols which are suitable in the preparation of polyurethanes, it is very difficult to avoid the formation of color bodies due to reaction conditions which generally involve heating at elevated temperatures under a partial vacuum. The formation of undesirable coloration is especially pronounced in polyester formulations which include dimer acids. Dimer acids as used herein are defined as a species of dicarboxylic acids which are prepared by the Diels-Adler ethylenic reaction of drying oil acids such as, for example, linoleic acid or linolenic acid or the dimer acids described in, for example, U.S. Pat. No. 3,158,584.

The suitability of polyester polyols in the preparation of polyurethane coatings is further dependent on the number of reactive sites or branch points available on the polyester molecule. It is, of course, preferable that the polyester containing only hydroxyl groups as reactive sites or branch points. As the equivalent weight of the polyester is inversely proportional to the number of branch points, it is desirable to produce a polyester having as high an equivalent weight as possible at the same time having as many reactive sites or branch points as possible.

It has been found that the durability, hardness and weathering resistance of polyester based urethane coatings are dependent on the number of branch points contained in the polyester. It has further been found that the color degradation of polyester based urethane coatings is substantially reduced when dicarboxylic acids other than the dimer acids defined hereinabove are used in the polyester formulation.

Thus polyesters having the foregoing desirable properties are provided which comprise the reaction product of dicarboxylic acids other than dimer acids, dicarboxylic acid anhydrides, dihydric alcohols and trihydric alcohols. More specifically polyesters having an hydroxyl number of from 72 to 78 and an acid number of from 3 to 8 and a combined hydroxyl plus acid number of from 80 to 86 are prepared by a process comprising reacting a dicarboxylic acid other than a dimer acid, a dicarboxylic acid anhydride, a dihydric alcohol and a trihydric alcohol such that the molar ratio of dihydric alcohol to trihydric alcohol is from about 2.5 to 1 to about 6 to 1, the alochol being present in an amount such that it constitutes from about 0.7 to about 1.3 branch points per 1000 molecular weight units of polyester. The polyester polyols of the invention have a molecular weight of from about 3250 to about 3750 and an equivalent weight of from about 650 to about 750.

It has been found that should the upper limit of 1.3 branch points per 1000 molecular weight units be exceeded, the polyester will have a tendency to gel or crystallize and cannot be easily removed from the reaction vessel where it was prepared. Even when removed, it is very difficult to dissolve and not suitable for preparation of coating. Should the lower limit of 0.7 branch points per 1000 molecular weight units not be attained, the polyester will be unsatisfactory for use in coating compositions because the resulting coatings have unsatisfactory hardness, and poor corrosion resistance, weather resistance and chemical resistance.

The starting materials are those commonly used in the preparation of polyesters and are well-known to the art. Representative of suitable dicarboxylic acids are, for example, adipic acid, succinic acid, and the like; of the dicarboxylic acid anhydrides, phthalic acid anhydric and isophthalic acid anhydride are exemplary; of the dihydric alcohols, ethylene glycol, propylene glycol and butylene glycol may be mentioned; of the trihydric alcohols, trimethylolethane, trimethylolpropane and glycerol may be used. Other representative starting materials are disclosed for example, in U.S. Pat. Nos. 3,157,618 and 3,162,616.

A particularly preferred polyester is one wherein the dicarboxylic acid is adipic acid, the dicarboxylic acid anhydride is phthalic anhydride; the dihydric alcohol is 1,2-propylene glycol and the trihydric alcohol is trimethylolpropane.

The term "branch points" as used herein is defined as the ratio of the mols of trihydric alcohol to the total weight of polyester corrected for water of esterification and is calculated as follows for a typical polyester formulation:

| Starting Material | Lbs. |
| --- | --- |
| adipic acid | 1.520 |
| phthalic anhydride | 38.870 |
| 1,2-propylene glycol | 18.240 |
| trimethylolpropane | 7.150 |
| Total | 65.780 |
| less water of esterification | 5.105 |
| Net lbs. of polyester | 60.675 |

The correction for water of esterification is calculated as follows:

Since each mol of phthalic anhydride liberates one mol water, the amount of water attributable to phthalic anhydride is about:

$$\frac{38.87}{148} \times 18 \text{ or } 4.730 \text{ lbs.};$$

since each mol of adipic acid liberates two mols of water, the amount of water attributable to adipic acid is about:

$$\frac{1.52}{146} \times 36 \text{ or } 0.375 \text{ lbs.};$$

for a total of 5.105 lbs. of water.

The mols of TMP are obtained by simply dividing the lbs. of TMP used in the formulation by the molecular weight of TMP, i.e., mols TMP = 7.15/134 = 0.0534

The branch points per 1000 molecular weight units are then computed as follows:

$$\frac{\text{Branch Points}}{1000 \, MW \text{ Units}} = \frac{0.0534}{60.675} \times 1000 = 0.88$$

The polyesters of the invention are prepared by conventional esterification techniques employing conventional apparatus. Esterification is generally carried out in the presence of an inert atmosphere such as nitrogen. The polyol components are mixed in a suitable reactor and heated with stirring to from about 60°C to about 100°C. The acid components are then added and stirring and heating continued at such a rate such that the water of esterification can be rapidly removed, generally by distillation. The esterification reaction is continued until the acid number is in the range of 3 to 8, substantially all of the water of esterification and low boiling impurities are removed and the hydroxyl number is in the range of 72 to 78.

The reaction proceeds smoothly with heating and no catalyst is necessary although one may, if desired, employ a suitable esterification catalyst, for example, tertiary amines and/or organo/metallic compounds such as those described in, for example, U.S. Pat. No. 3,691,135.

The polyesters of the invention when further reacted with polyisocyanates provide urethane coating materials having excellent physical properties. When used as a coating component, the polyester is preferably dissolved in an inert organic solvent. Some suitable inert organic solvents are, for example, xylene, benzene, toluene, butyl acetate and cellosolve acetate. Cellosolve acetate is a particularly preferred solvent as it is the more physiologically acceptable. For most coatings applications, an about 65% by weight solution of polyester in the inert solvent is preferred.

Polyisocyanates suitable for reaction with the polyester polyols of the invention to prepare polyurethane coatings are any known aliphatic, cycloaliphatic, araliphatic or aromatic polyisocyanates, for example, tetramethylene-1,4-diisocyanate, hexamethylene-1,6-diisocyanate, cyclohexane-1,3- and 1,4-diisocyanate and isomeric mixtures thereof, 1-isocyanato-3,3,5-trimethyl-5-isocyanatomethyl-cyclohexane, phenylene-1,3- and 1,4-diisocyanate, tolylene-2,4- and -2,6-diisocyanate and isomeric mixtures thereof, naphthylene-1,5-diisocyanate, diphenylmethane, 4,4'-diisocyanate, triphenylmethane-4,4',4''-triisocyanate, polyphenyl-polymethylene-polyisocyanates which may be obtained by aniline-formaldehyde condensation according to the procedures described, for example, in U.S. Pat. Nos. 2,683,730; 3,277,173; 3,344,162 and 3,362,979.

The coating compositions are prepared simply by mixing the polyester and a suitable polyisocyanate in such proportions that the NCO to OH ratio is from about 0.5 to 1 to about 5 to 1 and preferably from about 1.1 to 1 to about 3 to 1. The coating compositions may, of course, be modified by the addition of other polyols such as polyethers, low molecular weight diols, polyesters and the like. Auxiliary materials such as, for example, inert fillers, plasticizers, pigments and the like may also be added. Such modifications are well within the skill of the art and need no further elaboration.

The following examples serve to illustrate the preparation of the polyesters of the invention and their utility in polyurethane coatings.

EXAMPLE 1

This example is illustrative of the preparation of a polyester according to the invention.

The following materials are charged in a 15 gallon stainless steel reaction kettle according to the procedure described hereinbelow:

| | | |
|---|---|---|
| 1,2-propylene glycol | 18.24 lbs. | (0.24 mol) |
| trimethylolpropane | 7.15 lbs. | (0.05 mol) |
| phthalic acid anhydride | 38.87 lbs. | (0.26 mol) |
| adipic acid | 1.52 lbs. | (0.01 mol) |

The reaction kettle is flushed with nitrogen and with a gentle purge of nitrogen, propylene glycol is charged and heated to about 100°C. When a temperature of about 100°C is reached, the trimethylolpropane, phthalic anhydride and adipic acid are added with stirring. The mixture is heated to a temperature of from about 200°C to about 250°C for about 9 hours, the water being removed by distillation. After essentially all of the water (about 5.1 lbs., 0.28 mol) is removed, a vacuum is gently applied and released very slowly to insure no loss of propylene glycol. About 60.68 lbs. of a polyester having an acid number of about 5, a hydroxyl number of about 78 and a Gardner color of about 3 obtained.

EXAMPLE 2

A polyester is prepared in a manner analagous to the polyester of Example 1 except that 5.86 lbs. (about 0.01 mol) of a dimer acid (Empol 1014, Emery Industries, Inc.) is used in place of the adipic acid. The resultant polyester has a Gardner color of about 14.

EXAMPLE 3

This example is illustrative of the preparation of a coating composition employing the polyester of the invention.

About 154 parts by weight of a 65 percent by weight solution in cellosolve acetate of the polyester prepared in Example 1 is reacted with about 13.3 parts by weight of hexamethylene-1,6-diisocyanate (NCO:OH ratio about 1.1:1). The reaction is catalyzed by the addition of about 5.6 parts of dibutyl tin dilaurate.

The composition, which has a pot-life of about 8 hours is painted on a stainless steel support to a thickness of about 1.5 mil. The film has a tack-free time of about 40 minutes as measured by the procedure outlined in U.S. Pat. No. 2,406,989.

After about 7 days curing at room temperature, the film exhibits the following physical properties:

| | |
|---|---|
| Sward Hardness | 48 |
| Taber Abrasion Index (ASTM D-1044) | |
| CS-17, 1000 g. | |
| mg./1000 cycles | 120 |
| Impact Resistance (Gardner method) | |
| Reverse, in.-lb. | >160 |
| Direct, in.-lb. | >160 |

Although the invention is described in considerable detail in the foregoing examples, it is to be understood that such examples are presented solely for purposes of illustration and that many variations may be made therein by those skilled in the art without departing from the spirit and scope of the invention.

What is claimed is:

1. A polyester polyol prepared by a process comprising reacting a dicarboxylic acid other than a dimer acid, a dicarboxylic acid anhydride, a dihydric alcohol and a trihydric alcohol such that the molar ratio of dihydric alcohol to trihydric alcohol is from about 2.5 to 1 to about 6 to 1, said polyester containing from about 0.7 to about 1.3 branch points per 1000 molecular weight units, having a molecular weight from about 3,250 to about 3,750 and having a hydroxyl number of from about 72 to about 78.

2. The polyester of claim 1 wherein the dicarboxylic acid is adipic acid, the dicarboxylic acid anhydride is phthalic acid anhydride, the dihydric alcohol is 1,2-propylene glycol and the trihydric alcohol is trimethylolpropane.

* * * * *